E. D. SHERRILL.
STEADY REST FOR LATHES.
APPLICATION FILED JULY 31, 1912.
1,059,225.
Patented Apr. 15, 1913.
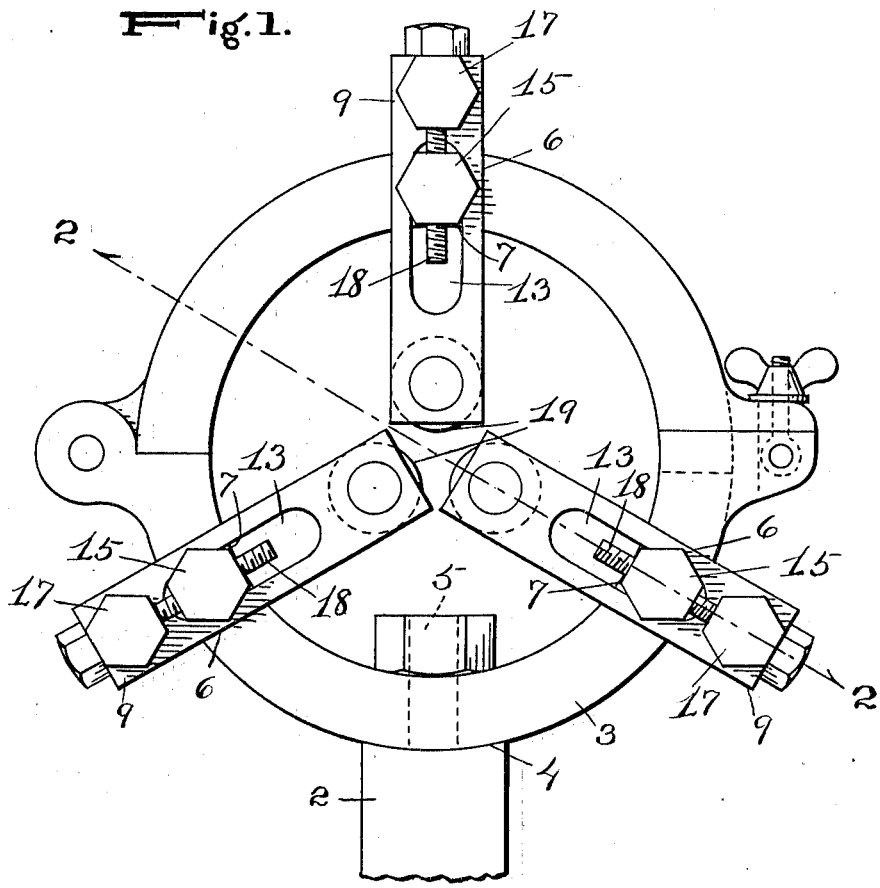
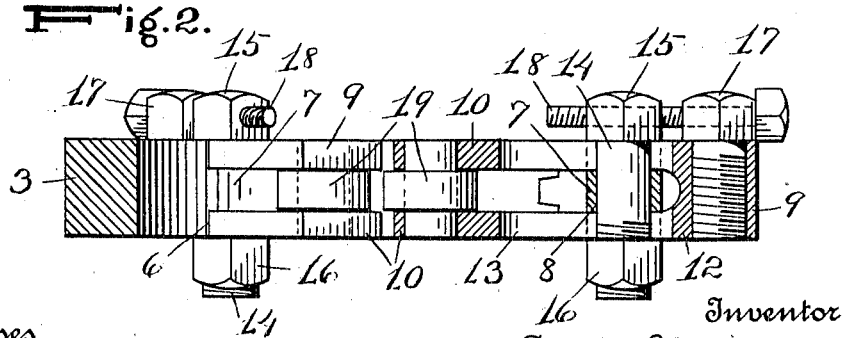

UNITED STATES PATENT OFFICE.

ESPY D. SHERRILL, OF HICKORY, NORTH CAROLINA.

STEADY-REST FOR LATHES.

1,059,225.  Specification of Letters Patent.  Patented Apr. 15, 1913.

Application filed July 31, 1912. Serial No. 712,538.

*To all whom it may concern:*

Be it known that I, ESPY D. SHERRILL, a citizen of the United States, resident of Hickory, in the county of Catawba and State of North Carolina, have made a certain new and useful Invention in Steady-Rests for Lathes; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention. Fig. 2 is a setion on the line 2—2, Fig. 1.

The invention relates to improvements in steady rests or followers for lathes, and it consists in the novel construction and combinations of parts, as hereinafter set forth.

In the accompanying drawings, illustrating the invention, the numeral 2 indicates a tool post to which the circular body 3 of the steady rest is secured, the post having a concave bearing 4 at its upper end and a threaded projection 5 therefrom, said projection being designed to engage a perforation in the bottom of the circular body or ring 3, which is designed to be seated in the bearing 4 and to be firmly secured in place by a nut engaging the threaded end of the projection. This body may be made in two semicircular parts, secured together so that it can be opened. The front and rear faces of this body are parallel, and have series of equidistant radial channels or recess seats 6, which are usually three in number in each face. The radial channel seats of the front are opposite to those of the back, and between each two opposite channels the body of the ring continues in the form of an intermediate bearing 7, through which is made a perforation 8. Each channel seat is made deep enough to receive an arm of an adjustable bifurcated bar, which engages the intermediate bearing 7. For ordinary purposes the body may be made about an inch thick from front to rear and each channel seat one-third of an inch deep.

The adjustable bifurcated bar, indicated at 9, is preferably made of steel and is rectangular in cross-section. It is designed to be of about the same thickness as the circular body. Its bifurcations or arms 10 extend from the solid outer portion or head 12 and are of flattened rectangular form, to fit in the channel seats 6 in such wise that the intermediate thinner portion or bearing
7 of the ring is between them. The arms 10 are provided with longitudinal slots 13, through which passes a short bolt 14, which also passes through the perforation 8 of the bearing 7 of the ring. This bolt 14 is provided with a head 15 and a nut 16.

The outer end of the bar 9 is provided with a lug or abutment 17, which may be the head of a short screw seated in a perforation of the bar. Through this lug or head is made a perforation for the passage of the shank of a screw 18, which engages a threaded perforation in the head 15 of the short bolt 14. By means of the screw 18 very small or minute adjustments of the bar 9 in the radial direction may be made. This screw also prevents the short bolt from turning. The ends of the arms 10 of the bar 9 are provided with seats for the ends of the journal or bearing of the end roller 19, which forms with the end rollers of the other bars 9 the steady rest bearings for the work. The rollers should have a little play on their bearings for efficiency in smoothing the work. In adjusting these rollers the short bolts 14 which clamp the bars 9 to the channel bearings of the ring are loosened and the adjusting screws turned, to cause the bars to move radially inward until the rollers bear on the work. Then the nuts 16 of the short bolts are turned up to secure the bar in position, until another adjustment is required.

This steady rest is designed to take up but little room in the lathe, longitudinally, because of the parallelism of the faces of the circular body and the seating of the bars 9 in channels in these faces in such wise that the outer surfaces of the bars are substantially flush with the faces of the body or ring, and do not add to the longitudinal space required. Although the rest is designed to be arranged in the lathe so as to follow just behind the tool while cutting, it does not interfere with the operator or obstruct the view of the work, the pressure of which, through the bearing rollers, is transmitted to the circular body in an equalized or balanced manner, so that there is no obliquity of strain.

Having described the invention, what I claim and desire to secure by Letters Patent is:

1. In a steady rest or follower, a circular body having opposite radial channeled seats and an intermediate perforated bearing, a radial roller-carrying bifurcated bar having slotted arms in said seats and engaging said bearing, a clamping bolt engaging said arms and said bearing, and an adjusting screw engaging said bolt and connected to said body.

2. In a steady rest or follower, a circular body having opposite radial recess seats, slotted radial bifurcated bars engaging said recess seats, rollers carried by said bars, clamping bolts engaging said bars and said seats, and adjusting screws engaging the clamping bolts and connected to the bars.

In testimony whereof I affix my signature, in presence of two witnesses.

ESPY D. SHERRILL.

Witnesses:
D. D. ROWE,
C. A. MOSER.